United States Patent [19]

Feldman et al.

[11] 4,270,271
[45] Jun. 2, 1981

[54] TRIMMING HEAD FOR VEGETATION

[75] Inventors: Robert I. Feldman, Agoura; Dana F. Thesman, Torrance, both of Calif.

[73] Assignee: Versatool, Inc., Encino, Calif.

[21] Appl. No.: 67,148

[22] Filed: Aug. 13, 1979

[51] Int. Cl.³ .......................................... A01D 50/00
[52] U.S. Cl. ..................................... 30/276; 56/12.7
[58] Field of Search ....................... 30/276, 347, 240; 56/12.7, 295

[56] References Cited

U.S. PATENT DOCUMENTS

| | | | |
|---|---|---|---|
| 3,320,733 | 5/1967 | Kirk | 56/295 |
| 3,500,622 | 3/1970 | Bowen | 56/295 |
| 3,621,642 | 11/1971 | Leake | 56/295 |
| 4,024,635 | 5/1977 | Mizuno | 30/276 |

Primary Examiner—Jimmy C. Peters
Attorney, Agent, or Firm—Lyon & Lyon

[57] ABSTRACT

A head for a rotary drive designed for trimming of vegetation. The head includes two circular plates coaxially arranged with pivotally mounted plastic blades positioned on pins between the plates. The blades are held outwardly by centrifugal force but are free to rotate to between the plates when contacting rigid objects. A glide knob extends from the bottom of the head for improved control of the device.

8 Claims, 4 Drawing Figures

U.S. Patent  Jun. 2, 1981  4,270,271
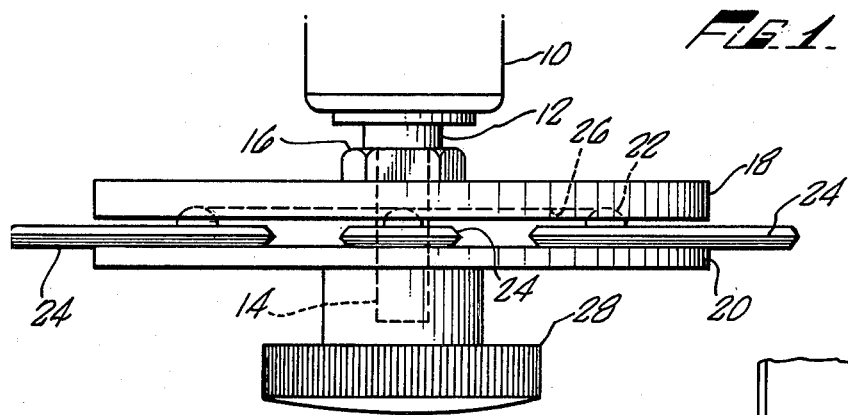
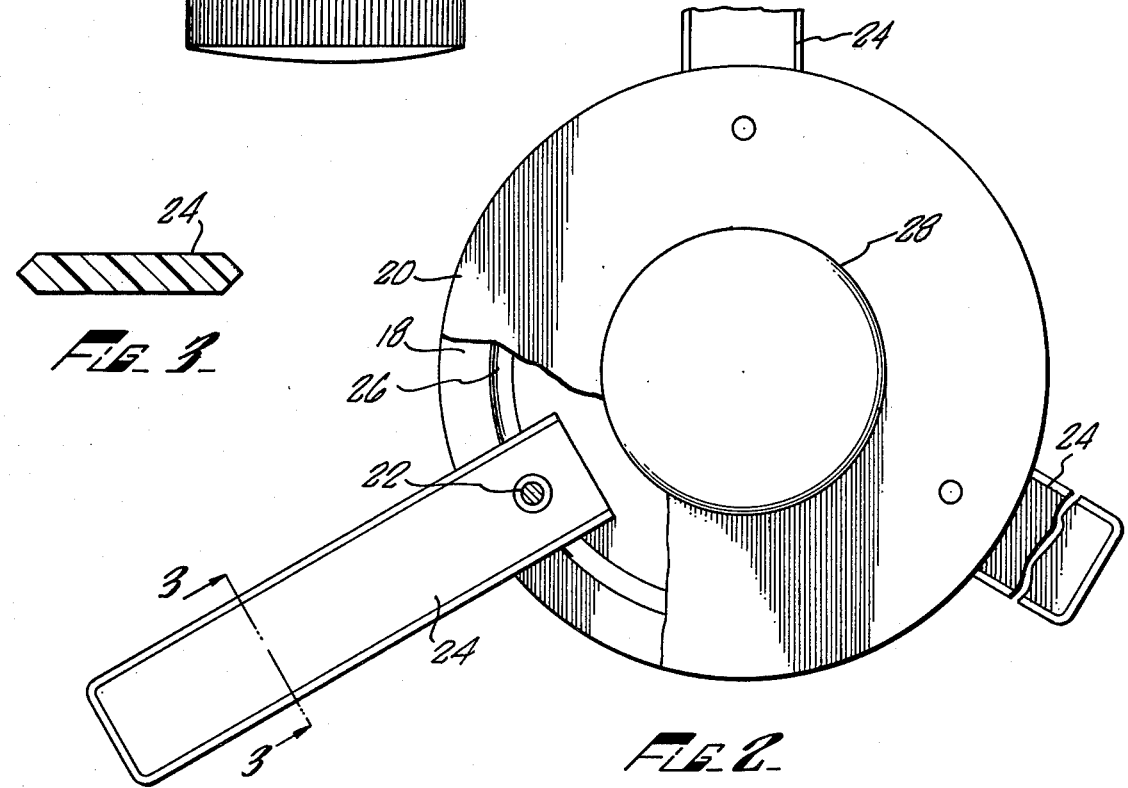
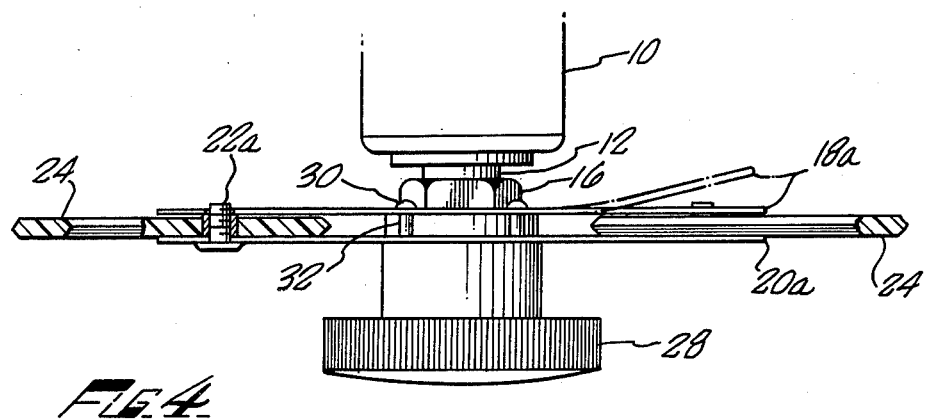

TRIMMING HEAD FOR VEGETATION

BACKGROUND OF THE INVENTION

The present invention is directed to gardening implements and more specifically to implements for trimming vegetation.

Recently devices having a resilient cutting system have been developed and have been found to be commercially successful. One such device employs a monofilament line which is rotated at high speed. The line is capable of cutting vegetation such as grass and the like. However, the line has been found to be easily abraded and broken by coming into contact with cement walks, sprinkler heads, heavier vegetation and the like. The need to constantly draw additional filament out of the device to replace the broken strand is inconvenient and bothersome.

Other devices have employed rigid metal blades which, when contacting a very rigid object, can pivot away from the object. However, the metal blades generally require a sophisticated mounting system if they are able to withdraw from the cutting zone and are very capable of substantial injury to the operator. Consequently, the available choice of trimming devices has been limited to either relatively dangerous metal cutting equipment or safer equipment requiring constant attention to the cutting element.

SUMMARY OF THE INVENTION

The present invention is directed to a cutting head for vegetation which is adapted to employ pivotally mounted plastic blades. The cutting head of the present invention is illustrated in two embodiments each of which provides for easy replacement of blades and safe cutter operation.

The head includes two parallel plates with pins which are fixed to one of the plates and extend to the other of the plates for receipt and retention of plastic blades. The blades are capable of swinging from a radial position when contacting rigid objects such as fingers, heavy branches, sidewalks, etc. Thus, the apparatus has advantageous safety features not normally associated with conventional trimming implements.

The simple two-plate construction also makes it easy to replace blades when they become worn or broken. The additional life of the plastic blades and the ease of replacement compares favorably with the filament type trimmers presently known. In one instance, the blades are removed through a simple unscrewing of the glide knob and removal of one plate. In the other embodiment, the blades may be twisted off of the pin against the resistance of the spring metal retaining plate.

Thus, it is a object of the present invention to provide an improved trimming head for the cutting of light vegetation.

It is a further object of the present invention to provide a safe trimming head for cutting vegetation.

It is yet another object of the present invention to provide a trimming head for cutting vegetation which has easily replaceable cutting elements.

Other and further objects and advantages will appear hereinafter.

BRIEF DESCRIPTION OF THE DRAWINGS

FIG. 1 is a side view of the present invention.

FIG. 2 is a bottom view of the present invention with a portion of one plate broken away for clarity.

FIG. 3 is a cross-section taken along line 3—3 of FIG. 2.

FIG. 4 is a side view of an alternate embodiment of the present invention with one blade in cross-section for clarity.

DETAILED DESCRIPTION OF THE PREFERRED EMBODIMENT

Turning in detail to the drawings, and particularly FIG. 1, a trimming head is illustrated for use with a conventional rotary drive. The drive includes an extended arm 10 carrying a powered rotary shaft 12 having a threaded end 14. A shoulder 16 provides a stop for location of the threaded rotary unit.

The trimming head includes two circular and parallel plates 18 and 20. The upper plate 18 includes a central bore which is threaded so that it may be positioned up against the shoulder 16 and retained there. The lower plate 20 includes a smooth central bore such that it can slide easily from the threaded end 14 of the drive 12. In the embodiment illustrated in FIG. 1, the two plates 18 and 20 are capable of being disassembled from each other and are held apart by pins described below.

The exposed surfaces of the plates 18 and 20 are relatively smooth. This is both for convenience and to avoid catching the rotating head on anything. The inside surfaces are designed to accommodate pivotally mounted blades. To this end, the circular plate 20 includes upstanding pins 22 fixed thereto in a conventional manner. The pins are symmetrically placed for rotary balance and are also positioned at one radial distance from the center of the plate 20. In the embodiment illustrated in FIGS. 1 and 2, there are three such pins 22. Any number of pins may be employed however.

A plastic blade 24 is provided on each pin 22 to serve as the cutting element. The plastic blade includes a hole for mating with a pin 22 with an interference fit. The hole may be undersized by about 0.001 inch such that the blade will still be affected by centrifugal force such that it extends radially when rotated. At the same time, the interference fit is advantageous for ease of assembly. Each blade 24 is of plastic material such that it will be relatively safe even though placing one's hand in the path of the blade is not recommended. A high impact plastic is recommended. The blades are center sharpened as can best be seen in FIG. 3 to provide a maximum strength to the cutting element and at the same time improve the cutting capability thereof.

The circular plate 18 includes a receiving means which acts to receive the upstanding pins 22. In the embodiment of FIG. 1, this receiving means includes a circular channel 26 of sufficient depth to seat the pins 22 but not of sufficient depth so that the blades 24 are bound between the two plates 18 and 20. This relationship can best be seen in FIG. 1.

The relative sizes of the blades and plates are subject, to a certain degree, to design choice. However, it is advantageous for safety reasons to have the plate size and the pin location arranged so the blades 24 can pivot to positions where they do not extend from between the plates 18 and 20 to any substantial extent after encountering rigid objects. In this manner, the blades 24 can be protected as well as fingers and the like.

To retain the lower plate 20 in position, a glide knob 28 is positioned on the threaded end 14 of the drive shaft 12. The knob 28 may be tightened to force the plate 20 toward the plate 18 to retain the assembly in place. The glide knob 28 has a rounded and smooth lower surface such that it may be run along the ground to aid in guidance of the trimming head. It can be seen that by removal of the guide knob 28, the plate 20 is easily lowered and the blades 24 lifted from the pins 22. Thus, blades can be quickly and easily replaced when worn or broken.

A second embodiment of the present invention is illustrated in FIG. 4. In this second embodiment, the plates 18a and 20a are of thinner construction and are held together by rivets 30 or other conventional fastener. A spacing hub 32 retains the plates 18a and 20a in a fixed parallel relationship. The hub 32 may also be threaded for retention on the threaded end 14 of the drive shaft 12. The pins 22a extend upwardly through holes in the plate 18a which serve as receiving means such that the blades 24 are locked in place. The upper plate 18a is sufficiently resilient to allow the blades 24 to be removed and replaced as can be seen in phantom in FIG. 4. The glide knob 28 again is positioned beneath the plate 28. In this second embodiment, no disassembly is needed at all for removal of the plates 24 for replacement.

Thus, a trimming head for gardening use is disclosed which is relatively safe and yet does not require constant attention to the cutting elements for effective use of the device. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A trimming head for cutting vegetation, comprising
    a first circular plate having a first circular surface and a center bore for attachment of said first circular plate to a rotary drive;
    a second circular plate having a second circular surface and a center bore for attachment of said second circular plate to the rotary drive;
    a plurality of pins positioned symmetrically about said first surface at a first radius from the center of said first circular surface;
    receiving means recessed into said second surface for receiving said pins including a circular channel on said second surface at said first radius; and
    blades pivotally mounted on said pins between said first and second surfaces.

2. The trimming head of claim 1 wherein one of said first and second plates has a threaded bore and the other of said first and second plates has a smooth bore.

3. The trimming head of claim 1 wherein there are three said pins.

4. The trimming head of claim 1 wherein said blades are plastic.

5. The trimming head of claim 2 further comprising a glide knob threaded onto the drive, said threaded center bore being inwardly of said smooth bore on the drive and the smooth bore being between said threaded center bore and said glide knob.

6. The trimming head of claim 1 wherein said blades are capable of pivoting to a position substantially within said first and second plates.

7. A trimming head for cutting vegatation, comprising
    a first circular plate having a first circular surface and a center bore for attachment of said first circular plate to a rotary drive;
    a second circular plate having a second circular surface and a center bore for attachment of said second circular plate to the rotary drive;
    a plurality of pins positioned symmetrically about said first surface at a first radius from the center of said first circular surface;
    receiving means recessed into said second surface for receiving said pins; and
    blades pivotally mounted on said pins between said first and second surfaces said second circular plate being elastically deformable to allow removal of said blades from said pins.

8. The trimming head of claim 7 wherein said receiving means includes holes in said second plate for receiving said pins.

* * * * *